United States Patent
Thomasen

(10) Patent No.: US 6,279,679 B1
(45) Date of Patent: Aug. 28, 2001

(54) SELECTIVELY TUNED VIBRATION ABSORBER

(76) Inventor: Leonard N. Thomasen, 462 Bettencourt St., Sonoma, CA (US) 95476

( * ) Notice: Subject to any disclaimer, the term of this patent is extended or adjusted under 35 U.S.C. 154(b) by 0 days.

(21) Appl. No.: 09/474,655

(22) Filed: Dec. 29, 1999

Related U.S. Application Data

(60) Provisional application No. 60/114,254, filed on Dec. 29, 1998.

(51) Int. Cl.[7] .................................................... F16F 15/00
(52) U.S. Cl. ............................................ 181/208; 181/199
(58) Field of Search .................................... 181/207, 208, 181/209, 151, 199, 146

(56) References Cited

U.S. PATENT DOCUMENTS

| | | | |
|---|---|---|---|
| 5,528,005 | * 6/1996 | Bschorr et al. | 181/208 |
| 5,550,335 | * 8/1996 | Ermert et al. | 181/207 |
| 5,583,324 | * 12/1996 | Thomasen | 181/199 |
| 5,691,516 | * 11/1997 | Thomasen | 181/199 |
| B1 6,173,805 | * 1/2001 | Thomasen | 181/207 |

* cited by examiner

Primary Examiner—Khanh Dang
(74) Attorney, Agent, or Firm—Johnson & Stainbrook, LLP; Larry D. Johnson; Craig M. Stainbrook

(57) ABSTRACT

A selectively tuned vibration absorber comprising a stack of viscoelastic polymer damping plates, secured together with spacers at both ends and having metal tuning weights attached onto the topmost plate in the stack. The apparatus is secured to the low frequency drive unit of an in-wall loudspeaker with a metal mounting plate between the vibration absorber and the low frequency drive unit. Both ends of the vibration absorber are cantilevered over a tuning mounting plate centered between the ends of the unit, the degree of cantilever and the mass in the metal weights added to the topmost damping plate being variable such that the vibration absorber may be tuned to resonate at the fundamental resonance frequency of the low frequency drive unit.

20 Claims, 3 Drawing Sheets

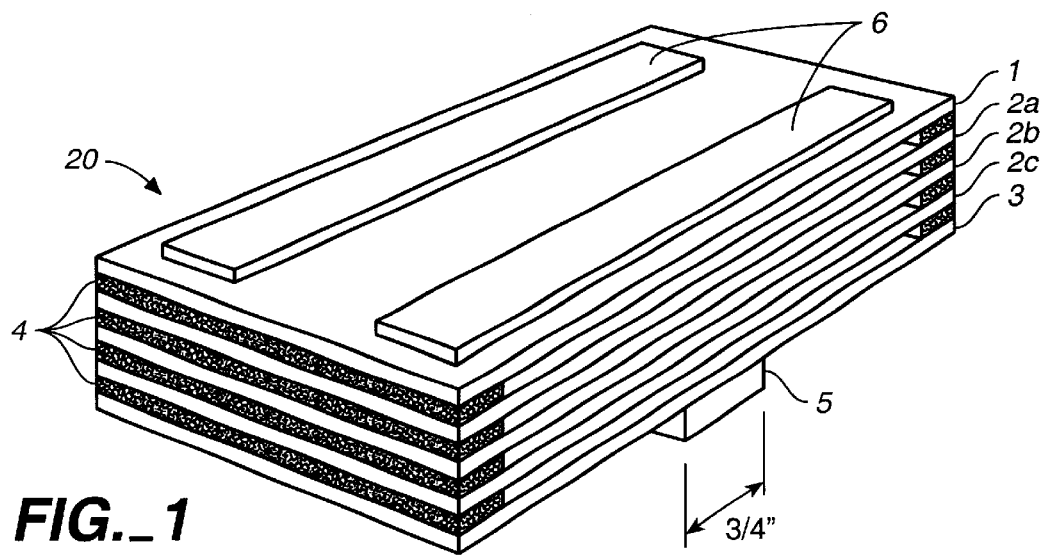
FIG._1
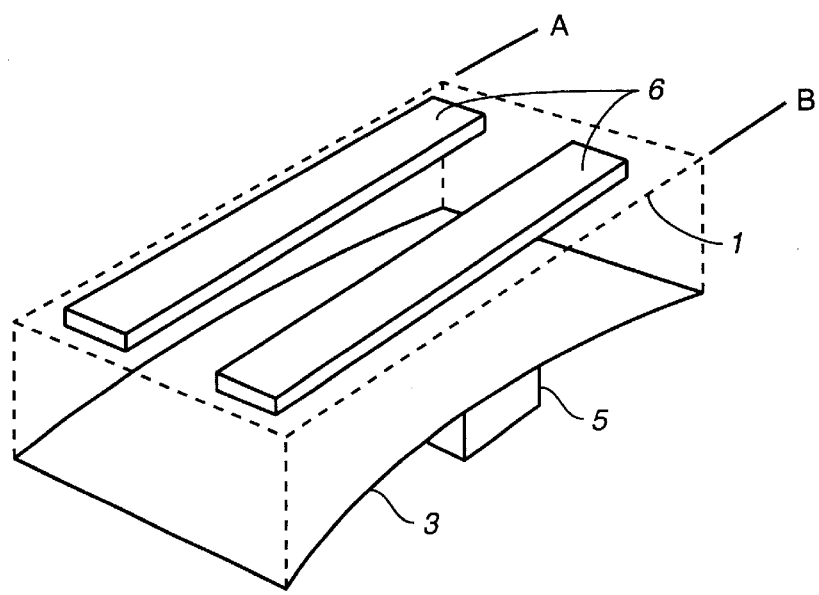
FIG._2
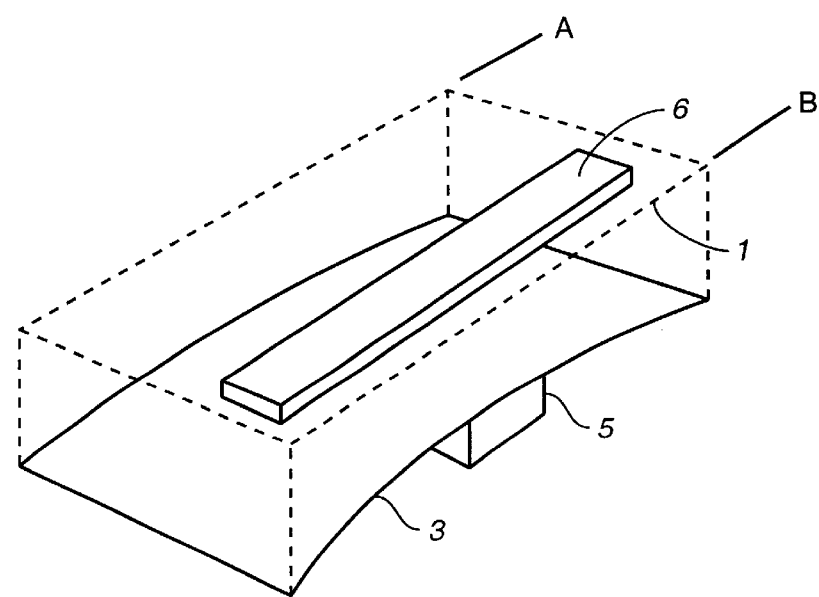
FIG._3

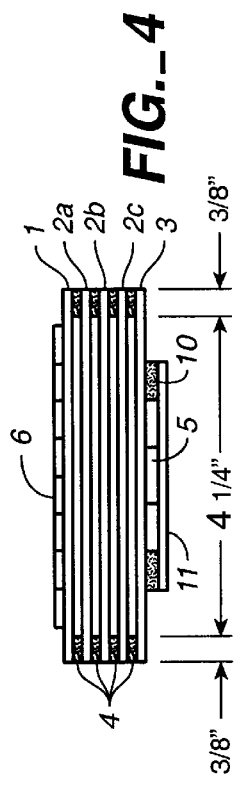
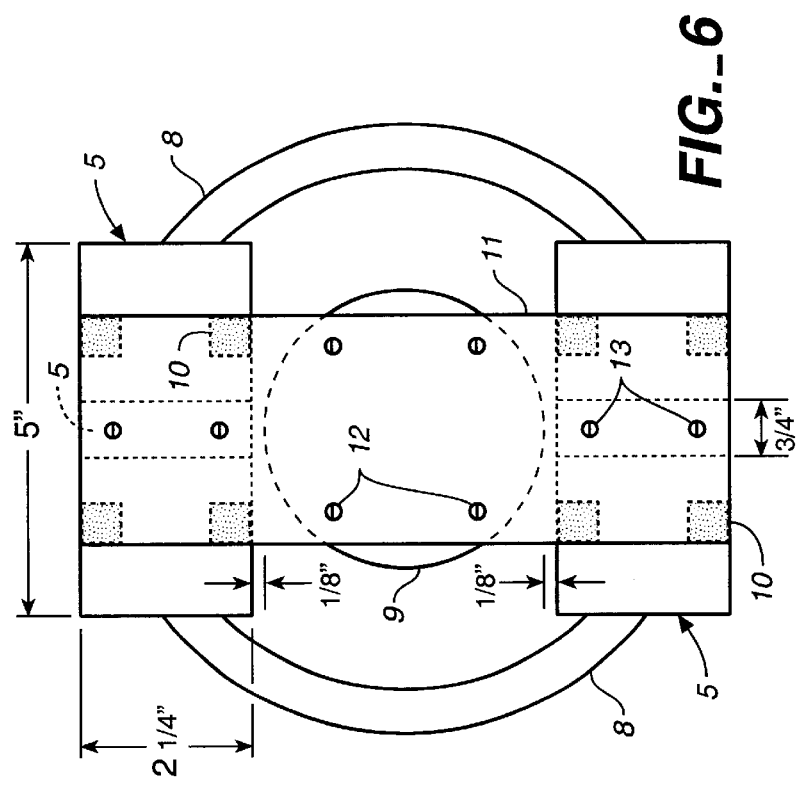
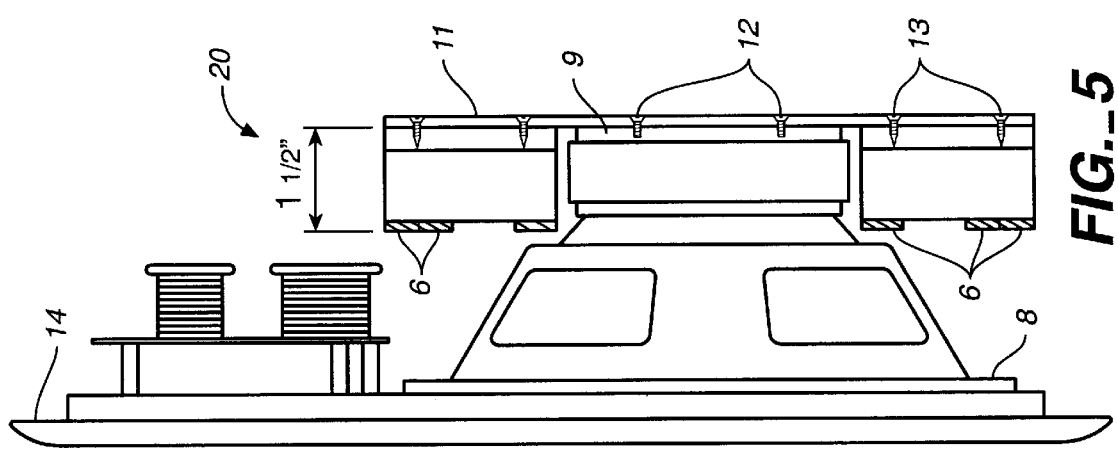

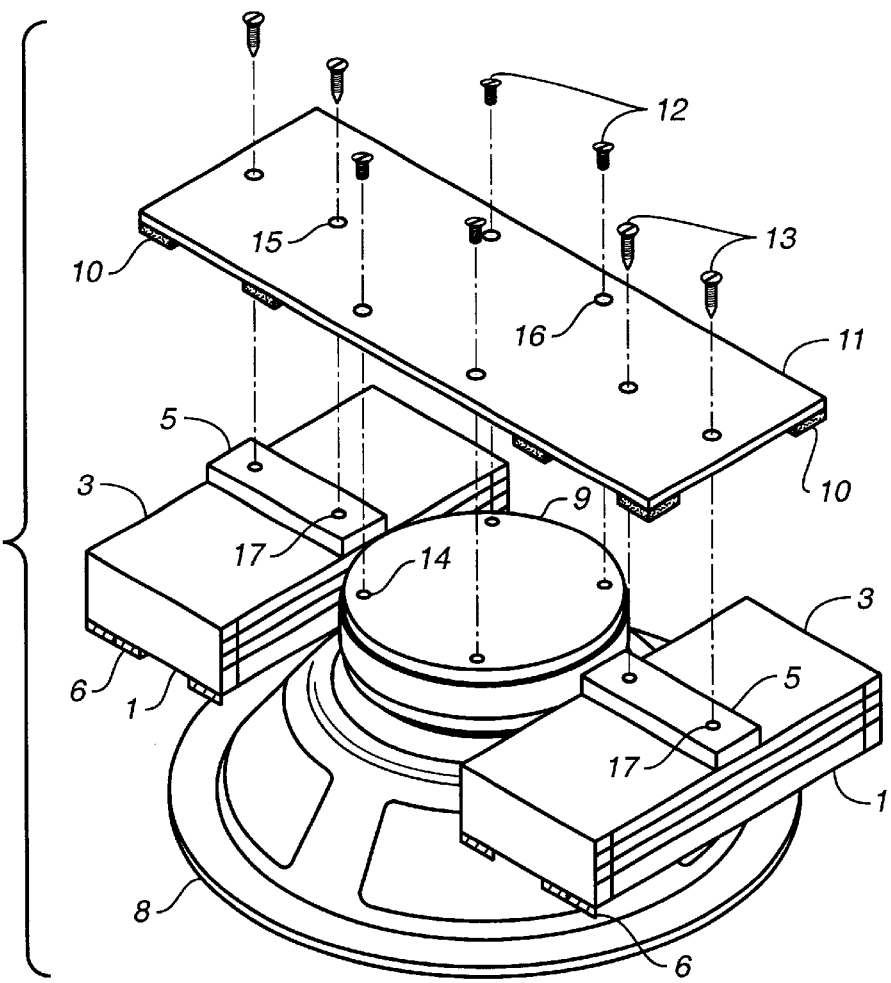
FIG._7
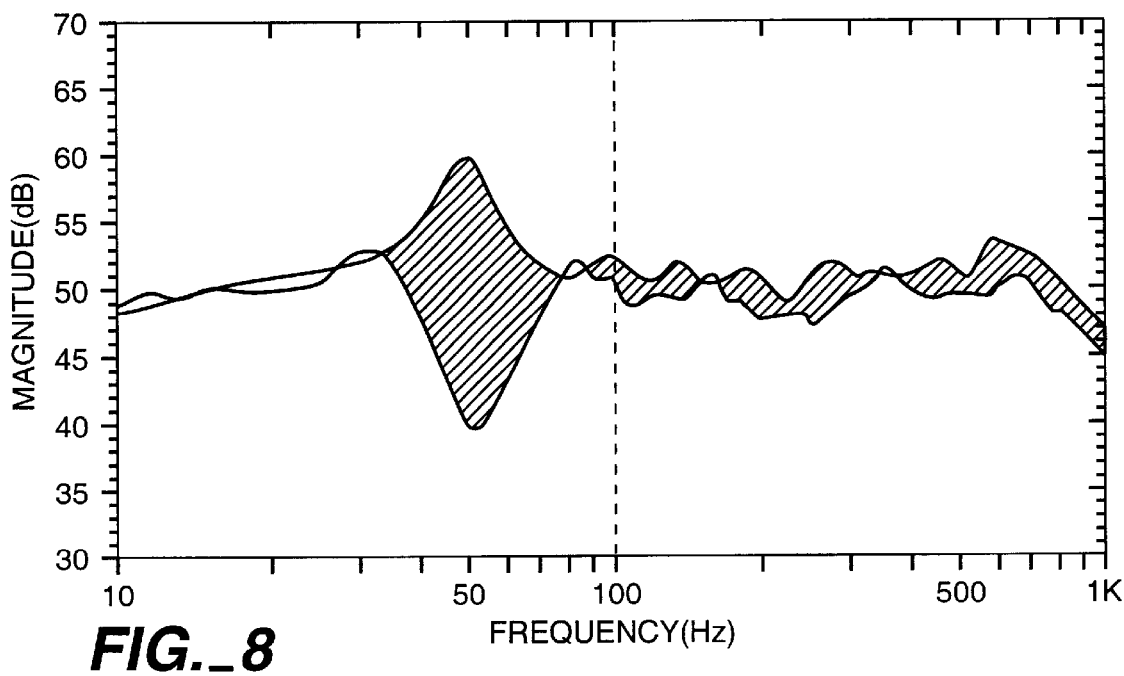
FIG._8

SELECTIVELY TUNED VIBRATION ABSORBER

CROSS-REFERENCE TO RELATED APPLICATION

This application claims the benefit of provisional application No. 60/114,254, filed Dec. 29, 1998.

BACKGROUND OF THE INVENTION

Field of the Invention

The present invention relates generally to vibration attenuation devices, and more particularly to a vibration absorber tuned to resonate at a selected low frequency upon installation onto the low frequency drive unit of an in-wall loudspeaker.

SUMMARY OF THE INVENTION

In this invention, a stack of viscoelastic polymer damping plates, secured together with spacers at both ends and having metal tuning weights attached onto the topmost plate in the stack, is secured to the low frequency drive unit of an in-wall loudspeaker with a metal mounting plate between the vibration absorber and the low frequency drive unit. Upon installation onto the low frequency drive unit of an in-wall loudspeaker, both ends of the vibration absorber, where the damping plates are secured together, are cantilevered over a tuning mounting plate that is centered between both ends of the unit. The degree of cantilever between the tuning mounting plate and both ends of the unit, in addition to the mass contained in the metal weights added to the topmost damping plate in the stack, are varied such that the vibration absorber may be tuned to resonate at the fundamental resonance frequency of the low frequency drive unit to which the vibration absorber is attached. The vibration absorber, because it is selectively tuned, absorbs vibrations at the fundamental resonance frequency of the low frequency drive unit, thus reducing baffle vibrations and the distorted sound that results from these vibrations. In virtually all in-wall loudspeakers, the low frequency drive unit, as well as other drive units they employ, are mounted onto a thin flexible plastic baffle. Whenever an in-wall loudspeaker is in operation, mechanical energy originating in the low frequency drive unit is transmitted from the mounting frame of the low frequency drive unit into the in-wall loudspeaker's plastic baffle. During the energy transmission process, the baffle is subjected to periodic, or oscillating stress, causing mechanical energy to be released as baffle vibrations. Therefore, the low frequency drive unit, as well as other drive units that may be attached to the baffle, instead of remaining stationary in space, vibrate along with the baffle, causing severe response errors in the in-wall loudspeaker's sound radiation pattern. These response errors are responsible for causing the sound quality of in-wall loudspeakers to be severely distorted and therefor irritating to listeners. With the vibration absorber of this invention connected directly to the steel backplate of an in-wall loudspeaker's low frequency drive unit, mechanical energy originating in the drive unit at it's fundamental resonance frequency, instead of being transmitted solely into the thin plastic baffle causing it to vibrate, transfers more efficiently into the vibration absorber. As the unwanted mechanical energy transfers into the vibration absorber, the damping plates comprised in the absorber, being selectively tuned, are exited into sympathetic resonance at the fundamental resonance frequency of the low frequency drive unit. The transfer of mechanical energy from the low frequency drive unit into the vibration absorber causes this unwanted energy to be dissipated in the resonating modes of the vibration absorber's damping plates as heat. Converting mechanical energy to it's thermal state makes this energy unavailable in the in-wall loudspeaker to produce baffle vibrations and distorted sound.

Heretofore, a wide variety of vibration absorbing devices have been employed in the attempt to reduce vibrations that occur in loudspeakers that employ enclosures comprising rigid panels and a rigid baffle on which to support the loudspeaker's drive units. In these enclosures, there is usually ample space inside to install vibration absorbers onto the panels in order to reduce panel vibrations. However, in-wall loudspeakers differ mainly because they do not employ enclosures. In-wall loudspeakers, which are comprised only of a plastic baffle onto which their drive units are mounted, are normally installed into standard residential walls which, in most cases, have an inside depth of 3½ inches. A standard in-wall loudspeaker, with an 8 inch low frequency drive unit, once installed into a residential wall, will leave approximately ½ inch remaining between the back of its low frequency drive unit and the wallboard behind it. Mechanical energy originating in the low frequency drive unit of an in-wall loudspeaker is the source of severe baffle vibrations that occur at, and in near proximity to, the low frequency drive units fundamental resonance frequency. To be effective in substantially reducing such severe baffle vibrations, it is necessary to attach a vibration absorbing device directly onto the back of an in-wall loudspeaker's low frequency drive unit which is known to be the very source of unwanted baffle vibration.

It is therefore among the objects of this invention to provide a vibration absorbing device that is attached directly onto the low frequency drive unit of in-wall loudspeakers to reduce objectionable baffle vibrations and the distorted sound resulting from these vibrations. These and other objects, advantages and features of the invention will be apparent from the following description of a preferred embodiment, considered along with the accompanying drawings.

BRIEF DESCRIPTION OF THE DRAWINGS

FIG. 1 is a perspective view showing the vibration absorber unit of the invention.

FIG. 2 is a phantom view of the assembly of FIG. 1 showing two metal plates positioned onto the top plate at both edges of the assembly.

FIG. 3 is another phantom view of the assembly of FIG. 1 showing one metal plate positioned onto the top plate at one edge of the assembly.

FIG. 4 shows a front view of the assembly of FIG. 1.

FIG. 5 shows a side view of an in-wall loudspeaker showing the assembly of FIG. 1 attached to both ends of a metal mounting plate secured to the steel backplate of a low frequency drive unit.

FIG. 6 shows a rear view of a low frequency drive unit with the assembly of FIG. 1 attached to both ends of a metal mounting plate secured onto the steel backing plate of a low frequency drive unit.

FIG. 7 is an exploded view of a low frequency drive unit showing the method of assembly of two vibration absorbing units to the drive unit.

FIG. 8 is a graph showing magnitude of vibration versus frequency in reference to the tuning method of the invention.

DETAILED DESCRIPTION OF A PREFERRED EMBODIMENT

In the drawings, FIG. 1 shows the vibration absorbing unit of this invention. The vibration absorbing unit 20 includes a series of intermediate damping plates 2a, 2b, and 2c (the number of intermediate damping plates can be greater or smaller), secured together and to a top plate 1 and to a tuning compliance plate 3 via spacers 4 at the outer ends of the assembly. The top plate 1 serves as a platform upon which to secure metal tuning weights 6. In FIG. 1, it is also seen that a tuning compliance plate 3 is secured to the stack of plates at the outer ends of the assembly. A tuning mounting plate 5, secured to compliance plate 3, is centered between the outer ends of the assembly. The top plate 1 including the intermediate damping plates 2a, 2b and 2c, in addition to the compliance plate 3, the spacers 4, and the tuning mounting plate 5, are all made of the same viscoelastic polymer composed of acrylonitrile, butadiene and styrene, a material that is commonly known as ABS. In the present embodiment of the invention, the top plate 1 has a thickness of 0.125 inch while the remaining plates 2a, 2b, and 2c, including the spacers 4 and the compliance plate 3, have a thickness of 0.093 inch. The tuning mounting plate 5 has a thickness of 0.187 inch. In the drawing shown in FIG. 6, a metal connection plate 11 is shown connected to the steel backplate 9 of a low frequency drive unit 8 with flat head machine screws 12. It is also seen in FIG. 6 that two of the vibration absorber unit of FIG. 1 are attached to the metal connection plate 11 showing the two absorbing units connected at opposite ends of the metal connection plate 11 with flat head screws 13.

In the assembly shown in FIG. 4, it is seen in a front view that metal tuning plates 6 are secured to the top plate 1. The metal tuning plates may be secured to the top plate 1 with a pliable shock resistant foam material having a high-tack pressure-sensitive adhesive on both sides.

Referring now to the drawing shown in FIG. 6, it is seen that a total of eight damping pads 10 are positioned between the tuning compliance plate 3 of the unit of FIG. 1 and the metal connection plate 11 at the corner boundaries where the tuning compliance plate 3 meets with the connection plate 11. In the front view in FIG. 4, the damping pads 10 are seen located in their respective positions between the tuning compliance plate 3 and the metal connection plate 11. The damping pads 10 are preferably made of ethylene vinyl acetate, a compressible material with a density of two pounds per cubic foot and a durometer of 4.0. The compression resistance of the damping pads is 3.5 pounds per square inch and their tensile strength is thirty pounds per square inch. The damping pads measure ½ inch square and have a thickness of ¼ inch.

FIG. 5 shows a side view of two vibration absorber units 20 connected via a steel mounting plate 11 to a low frequency drive unit 8 mounted onto an in-wall loudspeaker baffle 14.

FIG. 7 is an exploded view showing the various components and their relationship in assembling the completed vibration absorbing assembly shown in FIG. 5. In this assembly, two vibration absorbing units 20 are first attached to the connection plate 11 with screws 13 as shown in FIGS. 5 and 6. The eight damping pads 10, with pressure sensitive adhesive on both sides, are pressed into their respective position on the connection plate 11 as shown in FIG. 6 prior to attaching the two vibration absorbing units 20 onto the connection plate 11.

The connection plate 11 is attached to the steel backplate 9 of a low frequency drive unit 8 with 8×32×⅜ inch flat head screws 12, countersunk into holes in the connection plate 11 and tightened into four holes drilled and tapped into the steel backplate 9 of a loudspeaker 8 to receive the screws 12. The dimensions of the vibration absorber 20, as shown in FIGS. 4, 5 and 6, consider that in-wall loudspeakers are generally available in the markets with low-frequency drive units that are limited to three standard sizes having diameters of 5¼ inches; 6½ inches and 8 inches. It has been found, from experience, that the connection plate 11, made of aluminum, with a standard width of three inches and a uniform thickness of ⅛ inch, is suitable for all three of the standard sizes of low frequency drive units normally employed in in-wall loudspeakers. Additionally, it has been found that the vibration absorber 20, given a width of 2¼ inches; a length of 5 inches; and a height of 1½ inches, as shown in FIGS. 4, 5 and 6, is suitable for all three of the standard sizes of low-frequency drive units normally employed in in-wall loudspeakers.

Since the spacers 4 are located at each end of the vibration absorber 20, and since each of the spacers has a width of ⅜ of an inch, the actual distance that the damping plates 2a, 2b and 2c are able to vibrate freely in space is 4¼ inches.

To those skilled in the art to which this invention relates, it will be seen that the intermediate damping plates 2a, 2b and 2c, in the assembly of FIG. 1, while they add to the total mass contained in the assembly, will resonate independently from and at a higher fundamental frequency than the entire assembly of FIG. 1 which, because of its greater mass and compliance, can be selectively tuned to resonate at the fundamental resonance frequency of the low-frequency drive unit to which the assembly of FIG. 1 is attached.

It will also be seen that the vibration absorbing device of this invention, attached directly to a low frequency drive unit via the connection plate 11, forms a mechanical continuum through which mechanical energy can be transmitted. Whenever the drive unit, to which the assembly of FIG. 1 is attached, is in operation, mechanical energy propagating through the mechanical continuum as periodic or oscillating stress, is dissipated as heat, primarily in the resonating modes of the compliance plate 3 and, to a lessor extent, in the compression and tension modes of the damping pads 10 of the vibration absorbing assembly. The loss of mechanical energy results from the effect known as hysteresis loss—the phenomenon whereby there is a loss of energy due to the lag in response of an imperfectly elastic material to the forces effecting it.

The chart in FIG. 8 shows the extent to which the completed assembly of FIG. 5 attenuates baffle vibrations that normally occur in in-wall loudspeakers at the fundamental resonance frequency of their low-frequency drive units. In this example, the peak resonance shown at 50 $H_z$ in a typical eight inch two-way in-wall loudspeaker is attenuated by approximately 20 db. The shaded area in the graph (extending out to 1 $kh_z$, shows the absorption of energy in the frequency region residing above resonance due to sympathetic resonances which occur in the intermediate damping plates 2a, 2b and 2c in the assembly of FIG. 1.

Tuning the completed vibration absorbing assembly, comprising two vibration absorbing units of FIG. 1, as shown in FIG. 5, to the fundamental resonance frequency of the low frequency drive unit to which the assembly of FIG. 5 is attached, can be simplified by temporarily mounting the in-wall loudspeaker such that is reversed in the wall opening where the loudspeaker is to be permanently installed. Additionally, with the in-wall loudspeaker reversed in the wall opening, the assembly of FIG. 5 is attached to the in-wall loudspeaker such that it is also reversed, thus making the two vibration absorbing units shown in FIG. 1 accessible for adjusting the location and amount of mass that is needed on the top plate of the assemblies of FIG. 1 in order to tune the assemblies of FIG. 1 to the fundamental resonance frequency of the low frequency drive unit to which the completed assembly of FIG. 5 is attached.

It will be seen by those skilled in the art to which this invention relates that the aluminum connection plate 11, with a thickness of 1/8 inch, adds very little to the small distance that is normally available between a typical in-wall loudspeaker and the back wallboard of a typical residential wall. It is also seen that the connection plate 11, attached to the backplate 9 of a typical in-wall loudspeaker, acts as a moment arm that is cantilevered over both sides of the backplate 9. The amount of mass contained in the vibration absorbing unit of FIG. 1, and the value of compliance in the tuning compliance plate 3 of the unit, from that mass-compliance product factors in the equation $$F = \frac{1}{2\pi\sqrt{MC}},$$

which governs the fundamental resonance frequency of a mass-spring system.

With the completed assembly of FIG. 5 attached to a typical in-wall loudspeaker that is in operation, the vibration absorbing units of FIG. 1, when tuned to resonate at the fundamental resonance frequency of the low-frequency loudspeaker to which the assembly of FIG. 5 is attached, will resonate in response to, but in anti-phase with the excitation forces transmitted to the vibration absorbing units at the resonance frequency of the low frequency drive unit.

It will be seen from the relatively small physical size given to the vibration absorbing unit of FIG. 1, and the completed assembly of FIG. 5, that the preferred embodiment of this invention considers the limited space that is available within a typical residential wall. The dimensions for the vibration absorbing unit of FIG. 1 and the method of construction of the completed assembly shown in FIG. 5, as given in FIG. 4, FIG. 5, and FIG. 6, have been shown from experience, to be satisfactory for typical in-wall loudspeakers employing low-frequency drive units exhibiting fundamental resonances extending from approximately 45 Hz to 65 Hz. Tuning the vibration absorbing units of FIG. 1, attached via connection plate 11, to a typical in-wall loudspeaker, may be accomplished by adjusting the amount of mass and the position of the mass that is attached to the top plate of the vibration absorbing unit of FIG. 1 as shown in FIG. 2 and FIG. 3.

By using standard accelerometer measuring techniques, with the accelerometer placed in near proximity to that portion of the in-wall loudspeaker's baffle which is next to the top of the low frequency drive unit, the magnitude of baffle vibrations is first measured without any metal tuning weights attached to the top plate 1 of the unit of FIG. 1. It will be seen in FIG. 2 that, by attaching metal tuning weights having equal mass at edge A and edge B, that the compliance plate 3 bends uniformly at edges A and B during resonance and that, by attaching a single tuning weight at edge B, as shown in FIG. 3, the compliance plate 3 bends primarily at edge B.

By alternating the location of an accelerometer between various points on the baffle of an in-wall loudspeaker connected to a frequency generator while feeding a sine wave signal to the low frequency drive unit, metal tuning weights are added and subtracted as well as positioned alternately between edges A and edges B as shown in FIG. 2 and FIG. 3 until maximum attenuation of baffle vibrations is achieved at, and in near proximity to, the low frequency drive unit's fundamental resonance frequency.

It will be seen by those skilled in the art to which this invention relates, that the vibration absorbing units of FIG. 1, attached to a low frequency drive unit via connection plate 11, responds to a low frequency drive unit via connection plate 11, responds to excitation forces transmitted to them from the drive unit by resonating in anti-phase with the periodic stress which causes them to resonate and thus, by dissipating mechanical energy originating in the drive unit, renders this energy unavailable in the in-wall loudspeaker to produce baffle vibrations and the distorted sound that results from these vibrations.

The above-described preferred embodiments are intended to illustrate the principles of the invention, but not to limit its scope. Other embodiments and variations to this preferred embodiment will be apparent to those skilled in the art and may be made without departing from the spirit and scope of the invention as defined in the following claims.

While this invention has been described in connection with preferred embodiments thereof, it is obvious that modifications and changes therein may be made by those skilled in the art to which it pertains without departing from the spirit and scope of the invention. Accordingly, the scope of this invention is to be limited only by the appended claims.

What is claimed as invention is:

1. A vibration attenuating apparatus for reducing baffle vibrations and sound distortion in an in-wall loudspeaker, comprising:

a connection plate for connecting said apparatus to an in-wall loudspeaker;

connection means for attaching said connection plate to the backplate of the in-wall loudspeaker;

a plurality of vibration damping plates arranged in a stacked and spaced-apart configuration, said vibration damping plates comprising a tuning compliance plate, a top plate, and at least one intermediate vibration damping plate interposed between said tuning compliance plate and said top plate, all of said damping plates having outer ends;

a tuning mounting plate interposed between said tuning compliance plate and said connection plate and positioned such that said tuning compliance plate is cantilevered over said tuning mounting plate;

a plurality of damping pads interposed between said connection plate and said tuning compliance plate;

a plurality of spacers interposed between said vibration damping plates and disposed at each of said ends of said intermediate vibration damping plates for securing said damping plates one to another at their respective ends;

at least one tuning plate affixed to said top plate on the side opposite said at least one intermediate vibration damping plate; and attachment means for affixing said at least one tuning plate to said top plate.

2. The apparatus of claim 1 having at least two intermediate vibration damping plates.

3. The apparatus of claim 1 having at least three intermediate vibration damping plates.

4. The apparatus of claim 1 having at least four intermediate vibration damping plates.

5. The apparatus of claim 1 having at least five intermediate vibration damping plates.

6. The apparatus of claim 1 wherein said connection plate is fabricated from a metal.

7. The apparatus of claim 6 wherein said connection plate is fabricated from aluminum.

8. The apparatus of claim 1 further including a plurality of apertures in said connection plate for placement of screws, and wherein said connection means comprises a plurality of metal screws for screwing through said apertures and into the backplate of the in-wall loudspeaker.

9. The apparatus of claim 1 wherein said vibration damping plates are substantially rectangular.

10. The apparatus of claim 9 wherein said vibration damping plates have a width of 2¼ and a length of 5 inches, and wherein the entire apparatus has a height of 1½ inches.

11. The apparatus of claim 1 wherein said top plate, said tuning compliance plate, said damping plates, and said spacers are all fabricated from a viscoelastic polymer.

12. The apparatus of claim 11 wherein said viscoelastic polymer is Acrylonitrile Butadiene Styrene.

13. The apparatus of claim 1 wherein said top plate has a thickness of 0.125 inches, all other of said vibration damping plates have a thickness of 0.093 inch, said tuning mounting plate has a thickness of 0.187 inch, and said spacers have a thickness of 0.093 inch.

14. The apparatus of claim 1 wherein said at least one tuning plate is metal.

15. The apparatus of claim 1 wherein said attachment means comprises a pliable shock resistant foam material having a high tack, pressure-sensitive adhesive on both sides.

16. The apparatus of claim 1 wherein said tuning mounting plate is centered between the outer ends of said tuning compliance plate and said connecting plate.

17. The apparatus of claim 1 having four damping pads, wherein said damping pads are positioned between each corner of said connecting plate and said tuning compliance plate, are fabricated from ethylene vinyl acetate, have a density of two pounds per square inch, have a tensile strength of thirty pounds per inch, measure ½ inches square and have a thickness of ¼ inch.

18. The apparatus of claim 1 wherein said connection plate has a thickness of ⅛ inch.

19. The apparatus of claim 1 wherein said spacers have a width of ⅜ inch.

20. A vibration attenuating apparatus for reducing undesirable vibrations in a low frequency drive unit of an in-wall loudspeaker having a backplate, comprising:

a connection plate for connecting said apparatus to the loudspeaker backplate;

connection means for attaching said connection plate to the loudspeaker backplate;

a top plate;

a tuning compliance plate;

a plurality of intermediate vibration damping plates, all of a substantially rectangular shape, having the same size as one another and substantially the same size as said top plate and said tuning compliance plate, and arranged in a parallel, stacked and spaced-apart configuration, interposed between and spaced apart from said tuning compliance plate and said top plate;

a tuning mounting plate interposed between said tuning compliance plate and said connection plate such that said tuning compliance plate, said plurality of intermediate vibration damping plates, and said top plate are all cantilevered over said tuning mounting plate;

first through fourth damping pads interposed between the corners of said connection plate and said tuning compliance plate;

a plurality of spacers interposed between said vibration damping plates and disposed at each of said ends of said intermediate vibration damping plates for securing said damping plates one to another their respective ends, said spacers having a thickness of 0.093 inch, a width of ⅛ inch, and a length equal to the width of said intermediate vibration damping plates, said top plate, and said tuning compliance plate;

a first and second tuning plate affixed to said top plate on the side opposite said at least one intermediate vibration damping plate; and attachment means for affixing said first and second tuning plates to said top plate.

* * * * *